No. 882,103. PATENTED MAR. 17, 1908.
J. C. EDGECUMBE.
ROD PACKING.
APPLICATION FILED AUG. 1, 1907.
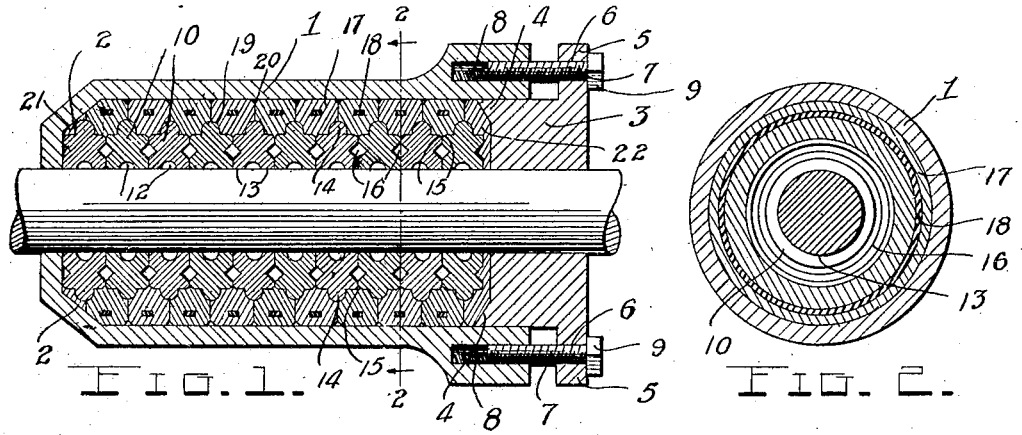
Fig. 1. Fig. 2.
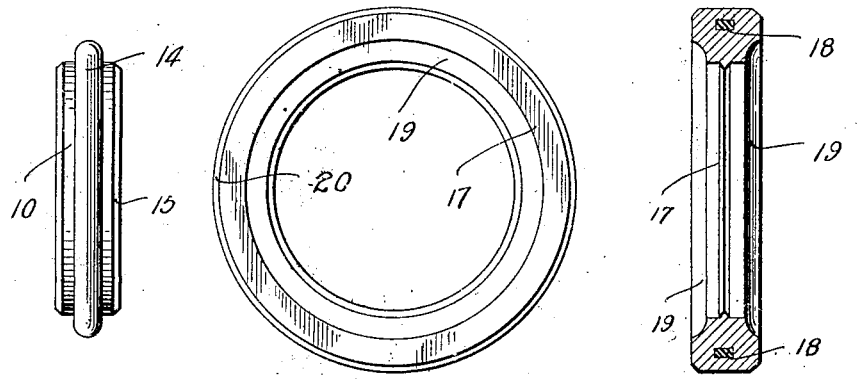
Fig. 3. Fig. 4. Fig. 5.
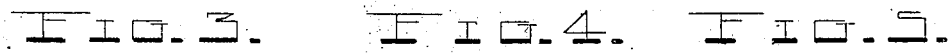
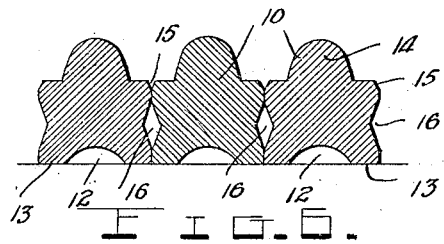
Fig. 6.
Witnesses
Chas. L. Griesbauer
C. H. Griesbauer
Inventor
J. C. Edgecumbe
by H. B. Willson & Co.
Attorneys

UNITED STATES PATENT OFFICE.

JOSHUA C. EDGECUMBE, OF CRANFORD, NEW JERSEY.

ROD-PACKING.

No. 882,103.

Specification of Letters Patent.

Patented March 17, 1908.

Application filed August 1, 1907. Serial No. 386,662.

*To all whom it may concern:*

Be it known that I, JOSHUA C. EDGECUMBE, a subject of the King of Great Britain, residing at Cranford, in the county of Union and State of New Jersey, have invented certain new and useful Improvements in Rod-Packing; and I do declare the following to be a full, clear, and exact description of the invention, such as will enable others skilled in the art to which it appertains to make and use the same.

This invention relates to improvements in packing for piston rods and the like.

The object of the invention is to provide a rod packing consisting of a series of metallic rings and flexible backing therefor, adapted to be compressed by the gland of the stuffing box to force the metallic packing into close fluid-tight engagement with the rod.

With this object in view, the invention consists of certain novel features of construction, combination and arrangements of parts as will be fully described and particularly pointed out in the appended claims.

In the accompanying drawings, Figure 1 is a vertical sectional view of a stuffing box showing the arrangement of the packing therein, and the application of the latter to a rod; Fig. 2 is a cross sectional view on the line 2—2 of Fig. 1; Fig. 3 is an outer edge view of one of the metallic packing rings removed from the stuffing box; Fig. 4 is a side view of one of the elastic fiber rings employed in connection with the metallic rings; Fig. 5 is a cross sectional view of the fiber ring shown in Fig. 4; and Fig. 6 is a detail cross sectional view through one side of three of the metallic packing rings, showing the form they assume when compressed by the fiber rings.

Referring more particularly to the drawings, 1 denotes a stuffing box which is open at one end and is provided in its opposite end with a centrally disposed opening through which the piston or other rod projects. In the closed end of the box, adjacent to the inner wall of the same, is formed an annular beveled or inclined surface, 2, and in the open end of the box is fitted a packing gland, 3, on the inner end of which, adjacent to its outer edge, is formed an annular inwardly inclined or beveled flange or projection. On the outer end of the gland 3 is formed a radially projecting flange 5 in which are formed bolt holes 6, through which are adapted to be inserted clamping screws 7, the inner threaded ends of which are adapted to be screwed into threaded holes 8 formed in the adjacent end of the box, as shown. The screws 7 are provided with squared heads, 9, which are adapted to engage the outer side of the flange 5 on the gland.

In the box 1 and around the rod therein is arranged a series of metal packing rings, 10, in the inner edge of each of which is formed an annular groove or channel, 12, between the outer edge of which and the outer edge of the rings are formed flat rod-engaging surfaces 13, which fit snugly against the outer side of the rod and form a fluid-tight joint therewith. On the outer edge of the rings 10 is formed a centrally disposed, radially projecting annular bead, 14. The opposite corners of the outer edge of the rings are beveled or cut off, as shown at 15, whereby when the rings are assembled in the box, said beveled corners form V-shaped annular grooves or channels.

In the opposite sides of the rings 10 are formed annular, centrally disposed V-shaped grooves or channels, 16, which, when the rings are assembled, coincide with the grooves in the next adjacent ring and form annular diamond shaped spaces between the rings.

Between the rings 10 and the inner wall of the stuffing box is arranged a series of fiber compression rings 17, in the center of each of which is embedded an annular elastic core 18, which is preferably formed of rubber and is rectangular in cross section as shown. The fiber rings 17 are arranged in the box to break joint with the metal rings 10, and in the opposite corners of the inner edges of said fiber ring are formed grooves or channels 19, which, when the fiber rings are arranged in position, are adapted to fit against or engage the opposite sides of the annular beads, 14, of the metal rings. The opposite corners on the outer edges of the fiber ring 17 are beveled or inclined so that when said fiber rings are arranged in position, a series of annular V-shaped grooves 20 are formed between each of said rings.

At the inner end of the box is arranged a metal filling ring, 21, which is adapted to engage the beveled corner 2 of the box on its outer side and to fit against the bead 14 and the outer edge of the innermost ring, 10. A similar filling ring 22 is provided at the end of the series of rings 17, said filling ring 22 being beveled on its outer side and adapted to receive the beveled flange on the inner end of the packing gland 3.

To adjust the packing rings 10 and compress the same into fluid-tight engagement with the rod, and with each other, the clamping screws 7 are screwed into the threaded holes 8 thereby forcing the gland 3 inwardly and causing the beveled flange on the inner end thereof to engage the filling ring 22 and the other fiber rings 17, thus compressing the same, which will compress the metal rings 10 together and into tight engagement with the rod. Continual pressure upon the packing rings 17 will press the metal rings 10 together, and cause them to assume the shape shown in Fig. 6 of the drawing, which will bind the squared or flat portions 13 on the inner edges thereof into engagement with the rod.

Having thus fully described my invention, what I claim as new and desire to secure by Letters-Patent, is:

1. A rod packing comprising a series of metal rings having formed in their inner edges annular grooves, on each side of which are formed flat annular rod engaging surfaces, a radially disposed outwardly projecting bead formed on the outer edge of said rings, a series of fiber packing rings arranged around said metal rings to break joint therewith, said fiber rings having annular grooves in their inner edges to engage the beads on said metal rings, and an elastic core arranged in each of said fiber rings, substantially as described.

2. A rod packing comprising a series of metal packing rings having formed in their inner edges and in their opposite sides annular grooves, a centrally disposed, radially projecting annular bead formed on the outer edge of each of said rings, beveled or inclined surfaces formed on the opposite outer corners of the same, a series of fiber rings having formed on the opposite corners of their inner edges annular grooves adapted to fit against or engage the beads on said metal rings, beveled or inclined surfaces formed on the opposite outer corners of said fiber rings, and an annular elastic core arranged in each of said fiber rings, said elastic core being rectangular in cross section, substantially as described.

3. A rod packing comprising an inner series of metal rings having formed in their meeting faces coincident annular grooves, and an outer series of fiber rings arranged around said metal rings, substantially as described.

4. A rod packing comprising an inner series of metal rings having formed in their meeting faces coincident annular grooves, and an outer series of fiber rings arranged around said metal rings to break joint therewith, said fiber rings having formed therein an elastic core, substantially as described.

In testimony whereof I have hereunto set my hand in presence of two subscribing witnesses.

JOSHUA C. EDGECUMBE.

Witnesses:
EUGENE F. KERSHAW,
JOHN H. B. GOEDECKE.